United States Patent [19]

Camboulives

[11] Patent Number: 4,641,783
[45] Date of Patent: Feb. 10, 1987

[54] EXHAUST NOZZLE ASSEMBLY FOR A TURBOJET ENGINE

[75] Inventor: André A. M. L. Camboulives, Paris, France

[73] Assignee: Societe Nationale d'Etude et de Construction de Meteur d'Aviation (SNECMA), France

[21] Appl. No.: 683,365

[22] Filed: Dec. 19, 1984

[30] Foreign Application Priority Data

Dec. 21, 1983 [FR] France ................ 83 20437

[51] Int. Cl.$^4$ .............................................. B64C 9/38
[52] U.S. Cl. ............................................ 239/265.39
[58] Field of Search ............... 239/265.33, 265.37, 239/265.39; 60/242; 244/213, 75 R, 53 R, 110 B

[56] References Cited

U.S. PATENT DOCUMENTS

| 2,697,907 | 12/1954 | Gaubatz ................. | 239/265.39 |
| 2,815,643 | 12/1957 | Geary et al. ............ | 239/265.39 |
| 2,969,641 | 1/1961 | Schaefer . | |
| 3,592,389 | 7/1971 | Johnson ................. | 239/265.39 X |
| 3,612,106 | 10/1971 | Camboulives et al. .... | 239/265.39 X |
| 3,730,436 | 5/1973 | Madden et al. . | |
| 3,820,720 | 6/1974 | Anders et al. . | |
| 3,837,580 | 9/1974 | Camboulives et al. ....... | 239/265.39 |
| 4,466,573 | 8/1984 | Camboulives et al. ....... | 239/265.41 |

FOREIGN PATENT DOCUMENTS

| 525114 | 1/1954 | Belgium . |
| 0033044 | 8/1981 | European Pat. Off. . |
| 1107564 | 1/1956 | France . |
| 1600362 | 8/1970 | France . |
| 2145362 | 7/1971 | France . |
| 2289747 | 10/1975 | France . |
| 862405 | 8/1961 | United Kingdom . |

Primary Examiner—Jeffrey V. Nase
Assistant Examiner—Daniel R. Edelbrock
Attorney, Agent, or Firm—Bacon & Thomas

[57] ABSTRACT

An exhaust nozzle assembly for a turbojet engine is described wherein the position of a series of nozzle flaps is controlled by control levels interconnected with an actuating cylinder. The control levers are transversely interconnected in order to synchronize the movement of the flaps and to also permit variation in the transverse distance between adjacent control members. A linkage mechanism is also disclosed which permits the actuation of a second series of flaps from the interconnected control members.

19 Claims, 7 Drawing Figures

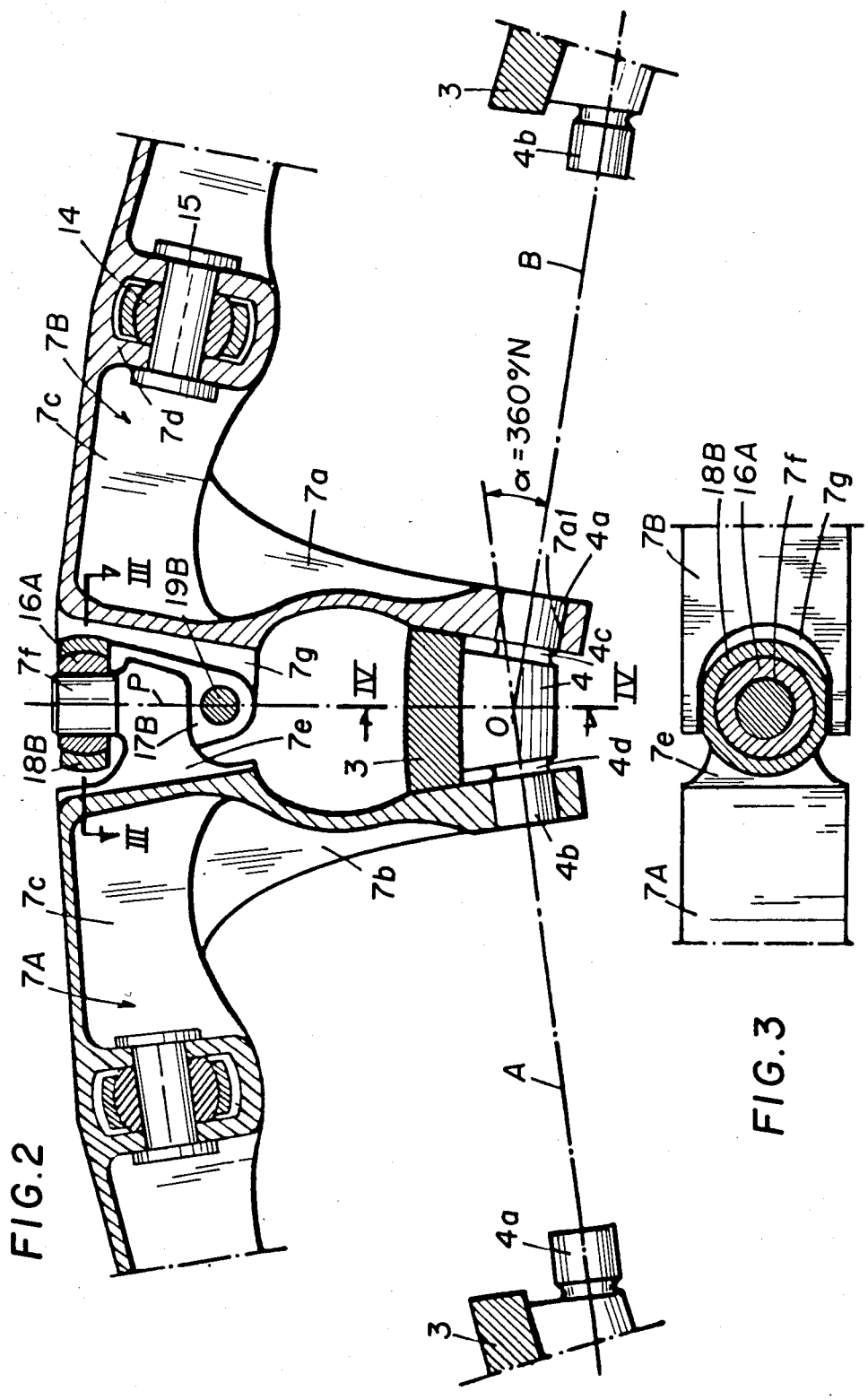

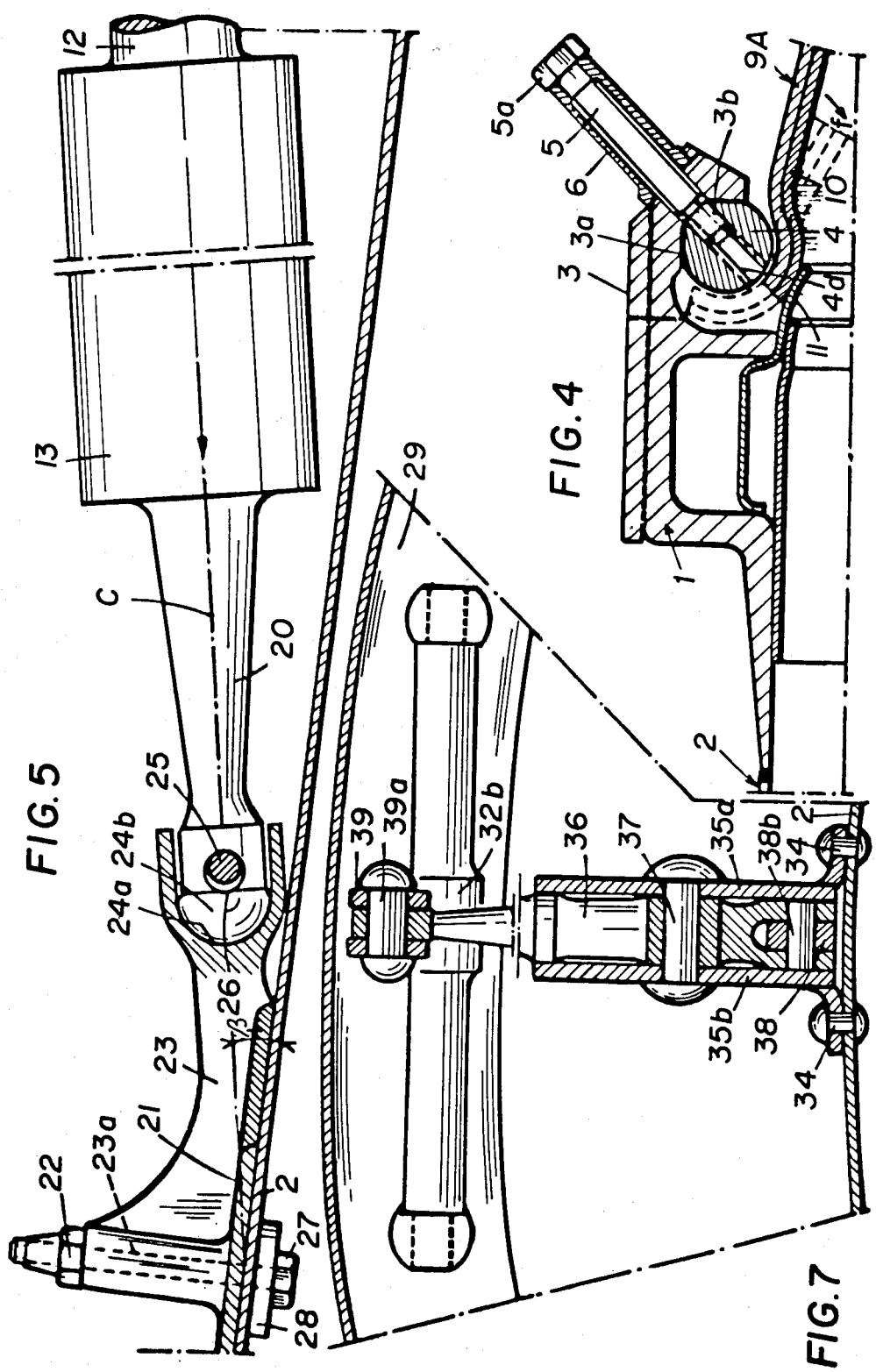

EXHAUST NOZZLE ASSEMBLY FOR A TURBOJET ENGINE

BACKGROUND OF THE INVENTION

1. Field of the Invention

The present invention concerns an exhaust nozzle assembly, in particular for a turbojet engine and provides a unique control system for adjusting the position of a plurality of nozzle flap assemblies.

2. Brief Description of the Prior Art

U.S. Pat. No. 4,466,573 describes an exhaust nozzle assembly for a turbojet engine wherein a plurality of first or "hot" flaps are pivotally attached at their upstream edges to an exhaust outlet pipe of the engine. A plurality of control cylinders, the bodies of which are connected to stationary parts of the nozzle, are connected to the first flaps by a transmission lever assembly. The number of first flaps is twice the number of the transmission levers, and each lever extends essentially over the entire width of alternate first flaps. These control levers are pivotally attached to an annular structural element affixed to the outlet pipe. The control rods of the control cylinders are pivotally attached to at least one of each two control levers at points spaced apart from the pivoting axes of the control levers.

In this known nozzle flap system, the pivoting movements of each pair of control levers are synchronized by two systems of parallel levers, each comprising an elbow lever interconnected at their pivot points by a torsion tube. One end of each elbow lever is attached to the annular structural element, while the other end is connected by a rectilinear lever to the upstream edge of the corresponding control lever. The mechanical system which ensures synchronization of the pivoting motions of the two adjacent control levers of the known nozzle system is relatively complex, heavy and expensive. This configuration also is extremely complicated since it must carry a large number of interconnecting levers, some of which serve to articulate the annular element to the upstream end of the exhaust pipe while others interconnect the same annular element with the flaps, the transmission levers, the bodies of the control cylinders and the synchronzing lever system.

SUMMARY OF THE INVENTION

The instant invention relates to an improved exhaust nozzle assembly for a turbojet engine wherein the system for controlling the orientation of the nozzle flaps is simplified compared to the prior art devices. The simplification results in a nozzle assembly which has lower manufacturing costs, lower maintenance expenses, easier maintenance and higher operating reliability than the nozzles according to the prior art. The system may also incorporate means to actuate a plurality of second or "cold" flaps with relatively little increase in its complexity.

The control lever members of the present system have means thereon which interconnect their lateral edges so as to synchronize the movement of all of the members. The interconnection comprises a ball joint element which serves to synchronize their movement, but at the same time allows for the variation in the distance between the transverse ends of the control lever members as they pivot about their nonaligned axes. This allows the complicated synchronization systems of the prior art devices to be eliminated, thereby resulting in an overall simplification of the nozzle flap actuating system.

The control lever members are arranged in a generally transverse plane about the engine exhaust outlet duct such that the angle between adjacent pivoting axes of the control lever members is approximately equal to a 360/N°, wherein N is the number of control lever members. The adjacent transverse edges of the control lever members are interconnected at points spaced radially outwardly from their pivoting axes. The sliding interconnecting twin latch is designed so as to compensate for the variation in the spacing between the transverse adjacent edges during the pivoting movement of the control lever members such that they form an annular chain of variable length. This is contrasted with the prior art devices wherein the control systems form annular chains of a constant length.

In a particular embodiment, the the interconnecting twin latch may comprise a female ball joint member carried by one of the control lever members and a male ball joint member carried by the adjacent control lever member. The female ball joint member is attached to the control lever member by a pivoting twin latch which pivots about an axis extending generally perpendicular to the plane of the control lever member. The male and female elements of the ball joint member also rotate about an axis contained in the plane defined by the central longitudinal axis of the engine and the point of intersection of the pivoting axes of two adjacent control levers members. The pivoting of the twin latch with respect to the control lever member to which it is attached compensates for the variation in transverse distance between adjacent ends of the control members as they pivot about their axes.

The control lever members are attached to the outlet duct by journal shafts which pivotally support the control lever members and which are, in turn, attached to the outlet duct structure. The journal shafts are attached to hook members evenly distributed about the circumference of the outlet duct. The journal shafts have bearing elements which extend laterally beyond the width of the hook members and which pivotally support the control lever members between them.

The system of the present invention may be utilized with a nozzle including only primary or "hot" flaps, and with a nozzle which incorporates a plurality of second or "cold" flaps. The second flaps are concentrically disposed about the first flap system and may have their upstream edges pivotally attached to a sliding annular skirt. The annular skirt is attached to the engine structure such that it traverses along a rectilinear path generally parallel to the central longitudinal axis of the engine. A system of levers and links interconnect the control lever members with the annular skirt and interconnect the first flaps with the second flaps such that as the angle of the first flaps with respect to the central longitudinal axis of the engine is varied, the similar angle of the second flaps is also varied as well as the annular skirt moving along its rectilinear path.

BRIEF DESCRIPTION OF THE FIGURES

FIG. 2 is a partial cross-sectional view showing the interconnection of adjacent control lever members according to the invention.

FIG. 3 is a partial sectional view taken along line III—III in FIG. 2.

FIG. 4 is a partial sectional view taken along line IV—IV in FIG. 2.

FIG. 5 is a partial side, sectional view showing the interconnection of the operating cylinder and the outlet duct according to the invention.

FIG. 7 is a sectional view taken along line VII—VII in FIG. 6.

DETAILED DESCRIPTION OF THE PREFERRED EMBODIMENTS

Figure 1:
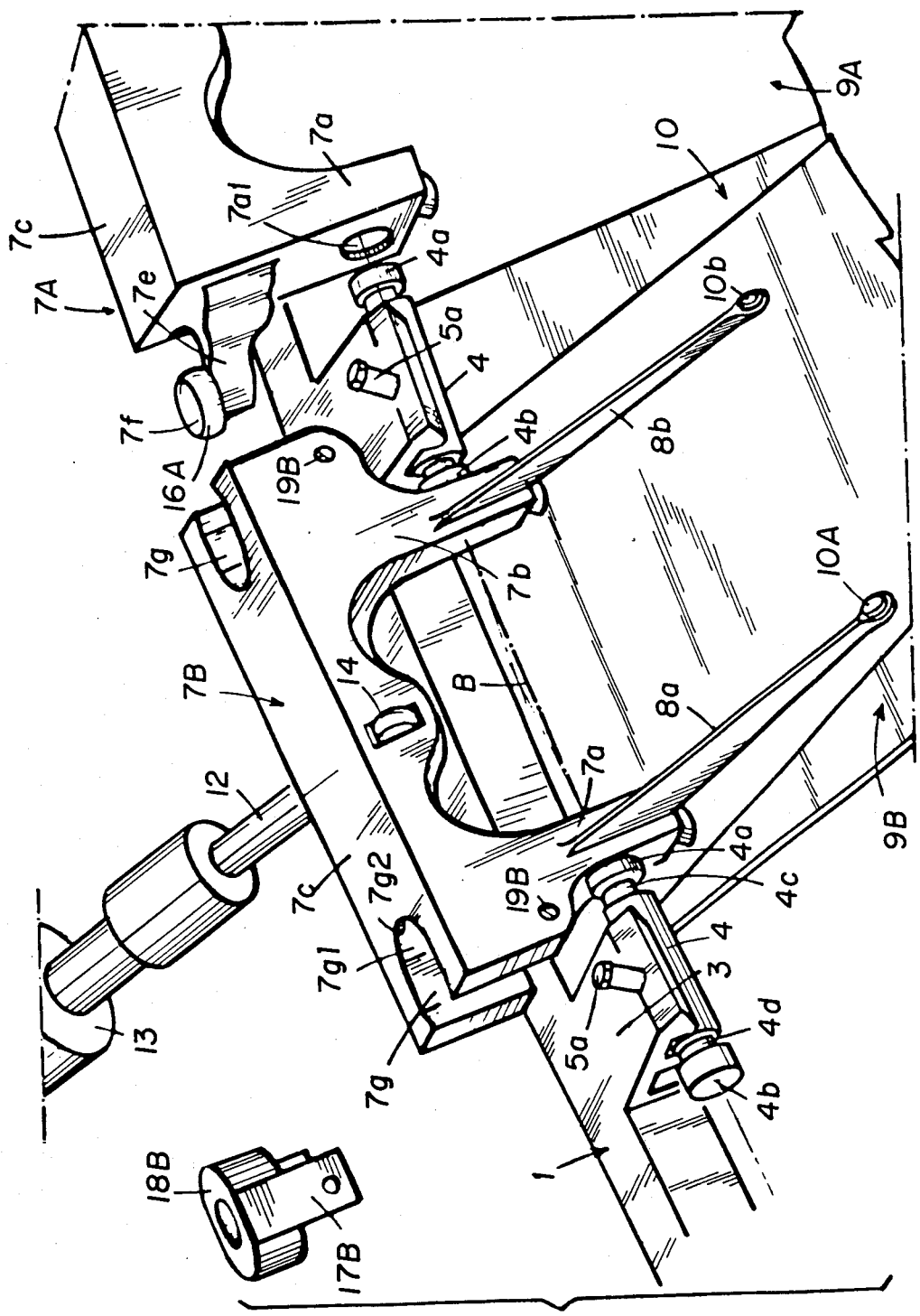
FIG. 1 is a partial perspective view showing the linkage mechanism of the improved nozzle assembly according to the invention.

In the first embodiment of the invention, as shown in FIGS. 1-4, 1 designates an annular structure attached by any appropriate, known means (such as by welding) to a portion of annular exhaust gas outlet duct 2 near its downstream edge. The annular structure may have a generally "U" shaped cross-section with the open portion of the "U" facing radially inwardly. A plurality of hook members 3 are formed on the annular structure 1 extending from the downstream face of annular structure 1, and are distributed evenly about the circumference of the outlet duct. As best seen in FIGS. 1 and 4, the hook members each define a radially inwardly facing slot, also having a generally "U" shaped cross-section. The slot has a flat surface 3b extending generally perpendicular to the central longitudinal axis of the duct and an adjacent flat surface 3a which extends generally perpendicularly to the surface 3b.

A journal bearing shaft 4 is attached to each of the hook members. The journal bearing shaft 4 has 2 flat, mutually perpendicular surfaces which contact the flat surfaces 3a and 3b of each hook member so as to accurately locate and position the journal bearing shaft 4 with respect thereto. Journal bearing shaft 4 defines a transverse theaded opening 4e which is threadingly engaged by bolt 5 extending through an opening in the hook member 3. The bolt head 5a is spaced from the hook member 3 by tubular spacer element 6 which serves to reduce the bending stress that may be applied to the bolt by inaccurate positioning of the journal shaft 4. Each journal bearing shaft 4 has a length exceeding the width of its respective hook member 3 such that cylindrical bearing portions 4a and 4b extend on either side of a respective hook member 3. Reduced diameter sections 4c and 4d serve to interconnect the journal bearing shaft 4 with the respective cylindrical bearing portions.

Cylindrical bearing portions 4a of one journal bearing shaft 4 and the cylindrical bearing portion 4b of an adjacent journal member 4 serve to pivotally support a control lever member between them. The control lever members shown in FIG. 1 are of two distinct configurations, which are alternated about the circumference of the outlet duct. Generally, each control lever member comprises a transverse portion 7c having a pair of legs 7a and 7b extending from a radially inward side of the transverse portion. Legs 7a and 7b are parallel to each other and are generally perpendicular to the transverse section 7c. Each of the legs 7a and 7b define recessed portions 7a1 on their lateral side which pivotally engage the cylindrical bearing portions 4a and 4b of the journal bearing shaft. As seen in FIG. 2, control lever member 7A rotates about axis A and the adjacent control lever member 7B pivots about axis B. The angle α between the adjacent pivoting axes is equal to 360°/N where N is equal to the number of control lever members.

. The first or "hot" flaps 9A and 9B contact the inner most ends of legs of 7a and 7b of the corresponding control lever member. Longitudinal arms 8a and 8b extend from legs 7a and 7b respectively, and may have means, such as screws 10a and 10b to attach their distal ends to the respective first flaps. The pressure of the exhaust gasses passing from the outlet duct through the nozzle assembly exerts a radially outward force on each of the first flaps 9 so as to force them against the legs 7a and 7b as well as the arms 8a and 8b. Between each of the flaps 9A and 9B controlled by a control lever member, a follower flap 10 is placed so as to prevent leakage of the exhaust gases between the controlled flaps. The structure and connection of these follower flaps 10 with the controlled flap is well known in the art and, per se, forms no part of the instant invention. The lateral edges of each of the follower flaps 10 extend to the inner surface of the controlled flaps 9A and 9B such that they are urged thereagainst by the forces exerted thereon by the exhaust gases.

As seen in FIG. 4, the journal bearing shaft 4 also serves as a pivot member for the controlled flaps, such as 9A and the follower flaps 10. The upstream edges of control flaps 9A, 9B and the follower flaps 10 are curved so as to approximately follow the curvature of the journal bearing shaft 4. As the angle of the flaps changes, the upstream edges move while remaining superposed, in contact with the curved peripheral surface of the journal bearing shaft 4. As the flaps are pivoted in the direction of arrow f in FIG. 4, the upstream edges of the flaps will follow the path indicated by the dashed lines. A seal plate 11 bears against the inner surface of the flaps and the annular structure 1 to prevent leakage of the exhaust gases between the juncture of the flaps and the annular structure. Again, the forces exerted on seal plate 11 by the exhaust gases maintain contact between the flaps and the seal plate.

In the embodiment shown in FIG. 1, only alternate ones of the control levers are connected to the control rod 12 of the control cylinder 13 in order to actuate the flaps. However, it is within the scope of this invention to connect each of the control lever members 7 to a corresponding control cylinder 13, as shown in FIG. 2. The end of control rod 12 is attached at the approximate mid portion of transverse portion 7c of the control lever member by ball joint 14 and pivoting axle 15, as shown in FIG. 2. In order to transmit the pivoting force to adjacent control lever members, ball joint means are utilized to interconnect them at their transverse ends. This interconnection assures the synchronized movement of all of the flaps. The ball joint means generally comprises a female ball joint member attached to the transverse end of one control lever member and an engaging male ball joint member attached to the adjacent control lever member. The control lever members according to the invention may take either of two configurations: first, a control lever member having female ball joint members on either transverse end may be alternated with adjacent control lever members having a male ball joint member on either end, as shown in FIG. 1; or, each of the control lever members may have a female ball joint member attached to one transverse end and a male ball joint member attached to its opposite transverse end.

As shown in FIG. 1, the transverse ends of control lever member 7B define generally radially extending grooves 7g each having opposite flat, parallel surfaces 7g1 interconnected by curved surface 7g2. The transverse end of groove 7 is open to accommodate the male ball joint element. The female ball joint member comprises female ball joint element 18B to which are attached twin latches 17B. The end of twin latches 17B is attached to the control lever member via pivoting pin 19B extending along an axis generally perpendicular to the transverse portion 7c of the control lever member. The twin latch 17B and the female ball joint element 18B are mounted so as to be within radial groove 7g in the control lever member.

The male ball joint member comprises a mounting arm 7e extending from one of the transverse ends of the control lever member 7, the mounting arm 7e has axle 7f attached to its distal end to carry the male ball joint element 16A. When assembled, as shown in FIG. 2, the axis of axle 7f is located in plane P which is defined by the central longitudinal axis of the outlet duct and point O, which is the intersection of adjacent control lever member pivoting axis A and B. The interconnection of the male and female ball joint members 16A and 18B, as well as the pivoting of the twin latches 17B about pivot pin 19B such that it bears against the flat, parallel walls 7g1, allows the distance between the transverse ends of adjacent control lever members to vary as the members pivot about their non-aligned pivot axis A and B. When each of the control lever members are in their median position, such that they are generally perpendicular to the central longitudinal axis of the outlet duct, the transverse distance between their edges is at a maximum. When the levers deviate from this median position, either by opening or closing the flaps, the transverse distance between their ends becomes less. This variation is accommodated by the ball joint means interconnecting the adjacent control lever members, but at the same time allows the actuating force to be transmitted between them.

Thus, the control lever members 7A and 7B form an annular chain having a variable length. During the pivoting of the control lever members, these variations in length occur at the sliding shackle connecting adjacent control lever members.

As noted above, in an alternative form, each of the control lever members 7 may have the male ball joint member attached to one end and a female ball joint member attached to the other. In this instance, the structure attaching the male and female ball joint members is exactly the same as that previously described.

FIG. 5 shows the means for attaching each of the control cylinders 13 to the annular outlet duct 2. The length of each control cylinder 13 and its associated control rod 12 is sufficient such that, in every position of the control lever member 7, the axis C of the control cylinder and rod makes only a small angle $\beta$ with the wall of the outlet duct 2. This minimizes the effect of any radial component of the reaction forces from the cylinder body 13 on the outlet duct 2 and reduces the danger of such forces causing deformation of the outlet duct. This also eliminates the requirement to provide any special reinforcing structure for the outlet duct at this attachment point. Each control cylinder 13, of linear displacement, has the upstream end of its body connected by relatively lengthy connecting rod 20 through a ball joint structure, with the downstream end of force equalizing strap 21. Force equalizing strap 21 is applied at least over a portion of the outlet duct 2 and is retained thereon by bolt 27, washer 28 and nut 22. Arm 23, attached to force equalizing strap 21 extends in a downstream direction and forms on its distal end a female portion of ball joint 24a which cooperates with male ball joint portion 24b formed on the end of rod 20. Pin 25 passes through elongated opening 26 and the ends of arm 23 so as to retain the unit in assembled relationship. Arm 23 may also be formed with integral sleeve 23a which surrounds bolt 27. Arm 23 is oriented such that an extension of rod 20 along the axis C of the cylinder 13 intersects the force equalizing strap 21 essentially at the point of its intersection with fastening bolt 27.

Figure 6:
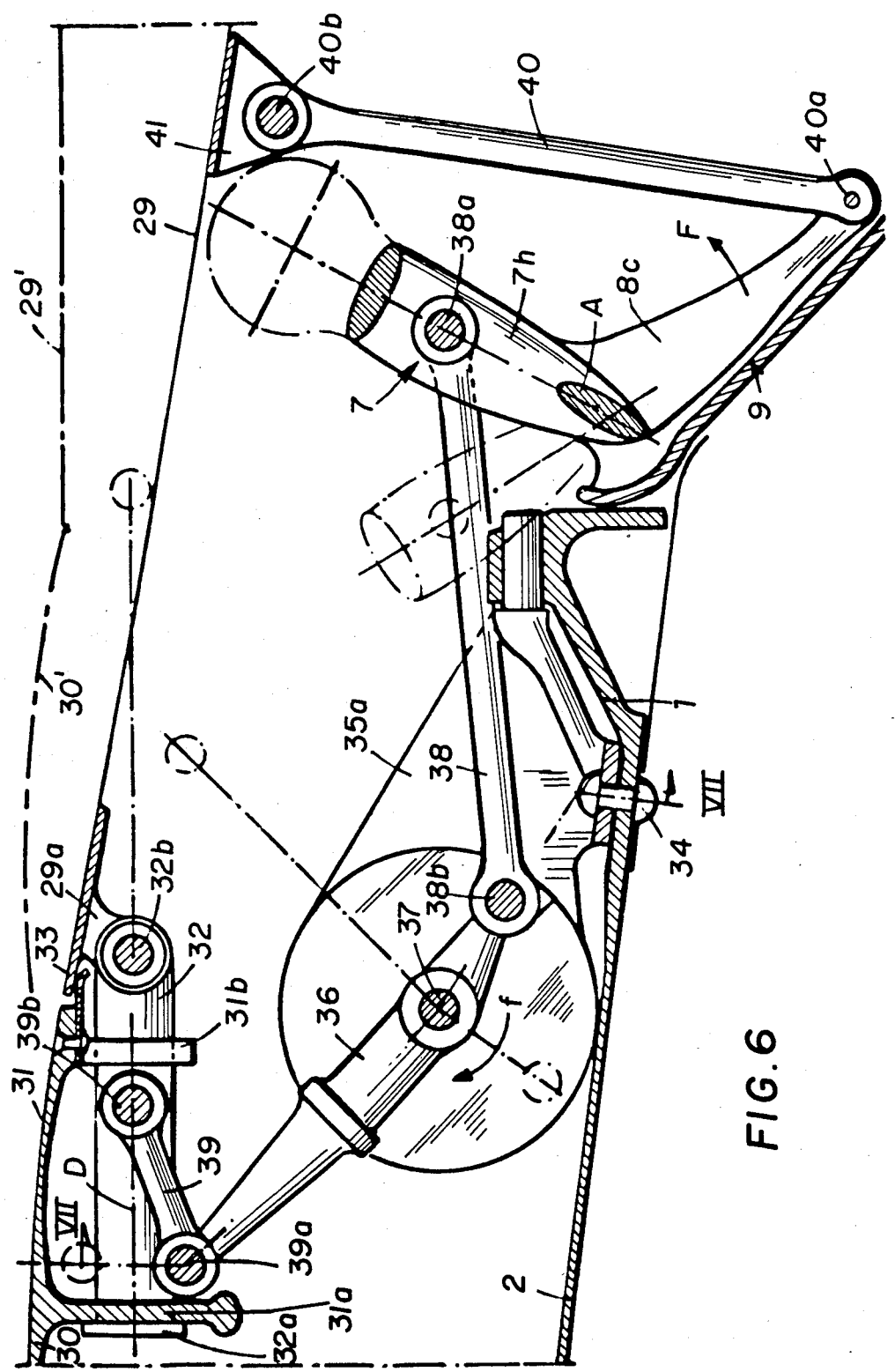
FIG. 6 is a partial side, sectional view showing an alternative embodiment of the invention.

As thus described, the actuating system may be utilized in a nozzle assembly which has only first or "hot" flap. However, the system may also be utilized with a nozzle assembly which utilizes a plurality of second or "cold" flaps in conjunction with the first flaps. As shown in FIGS. 6 and 7, a plurality of second or "cold" flaps 29 are distributed about the outlet duct so as to be concentrically arranged with respect to the first flaps 9. The flaps are shown in solid lines in FIG. 6 and their positions assumed when the nozzle is completely closed.

The exhaust outlet duct 2 is also provided with an annular skirt 30, disposed concentrically therewith, attached to the engine structure such that it may move along a rectilinear path generally parallel to the central longitudinal axis of the duct. Annular skirt 30 has strengthening ring 31 attached thereto which has, at its upstream portion inner flange 31a and, near it downstream end, internal lugs 31b. The number of internal lugs 31b may be equal to the number of control lever members 7.

Flange 31a and corresponding lug 31b are provided with aligned openings along axis D which is generally parallel to the central longitudinal axis of the outlet duct. Thruster 32 passes through each of the openings such that its upstream end 32a contacts flange 31a while its downstream end extends beyond lug 31b. Pivot axle 32b passes through the downstream end of thruster 32 and serves to pivotally attach the upstream edge portion of second flap 29 thereto. A sealing member 33 prevents leakage of any gases between the juncture of second flap 29 and the ring 31.

The exhaust gas outlet duct 2 has support plates 35a and 35b attached thereto by rivets 34, as shown in FIGS. 6 and 7. The support plates 35a and 35b are generally parallel to each other and lie in planes which are generally parallel to the central longitudinal axis of the duct. A second flap lever 36, having first and second ends, is pivotally attached to the support plates 35a and 35b intermediate its ends by pivot pin 37. In this particular embodiment, each control lever member has a third leg 7h extending from a radially inward surface parallel to and between legs 7a and 7b. First link members 38 interconnect the third leg 7h with the first end of second flap lever 36 by pivot pins 38a and 38b. Similarly, second link members 39 interconnect the second end of second flap lever 36 with a corresponding thruster 32 via pivot pins 39a and 39b. Leg 7h also has longitudinal arm 8c extending therefrom and third link members 40 serve to interconnect the distal end of arm 8c with a corresponding second flap 29 through pivot pins 40a, 40b and attaching bracket 41. The third link member 40 controls the position of second flap 29 as a function of the position of first flaps 9. The length of this link member is chosen such that, when the first flaps 9 are at a large angle with respect to the central longitudinal axis of the duct, the second flap 29 is slightly inclined with respect to the longitudinal axis of the duct, as shown in FIG. 6. Quite obviously, it is within the knowledge of a skilled designer to choose the lengths of the link members and pivoting levers so as to achieve the desired geometric relationships between the first and second flap members.

When the control lever members 7 are pivoted in the direction of arrow F, as shown in FIG. 6, the angle of the first flaps 9 with respect to the central longitudinal axis is decreased. Simultaneously, third link members 40 move the second flaps 29 radially outwardly into the position 29', shown in dashed lines in FIG. 6. The pivoting movement of control lever members 7 also cause second flap levers 36 to pivot about axis 37 in the direction of arrows f due to their interconnection by first link members 38. Second flap levers 36, in turn, cause the linear displacement of skirt 30 in the downstream direction due to the interconnection of second link members 39 with thrusters 32. This position 30' is indicated by the dashed lines in FIG. 6. Thus, during this motion of the first flaps 9, it can be seen that the second flaps 29 undergo a rotational movement as well as a translational movement in the downstream direction. The forces acting on second flaps 29, and its associated annular skirt structure 30 and 31 are transmitted to the annular structural element 2 through second link members 39, lever 36 and support plates 35a and 35b. Since the radial components of all of the forces acting on the system are relatively small, the chances of deforming the exhaust outlet duct 2 are minimal. Although, quite obviously, any number of such interconnecting systems may be utilized, they should be equal to at least three in number and should be distributed evenly about the periphery of the outlet duct 2 to minimize the risk of the jamming of the second flap assembly.

The important parameters of the operation of the second flaps 29 are the position of the downstream, outlet edges of these flaps with respect to the outlet plane of the first flaps 9, and the locking angle of the second flaps 29. The lengths of the second flap lever 36 and the longitudinal arm 8c can be selected so as to permit the optimum operating parameters for the intended mission of the engine.

Quite obviously, minor modifications of the previously described structure may be accomplished without exceeding the scope of this invention. For example, the female ball joint member may be mounted to a stationary arm (such as arm 7e) while the male ball joint member may be attached to twin latches (similar to 17B). In addition, it is possible to mount both the male and female ball joint members on sliding latches similar to 17b.

The foregoing description has been provided for illustrative purposes only and should not be construed as in any way limiting the invention, the scope of which is defined solely by the appended claims.

What is claimed is:

1. In a turbojet engine having an annular exhaust gas outlet duct with a central longitudinal axis, the improved exhaust nozzle assembly comprising:
   (a) a plurality of hook members attached to the outlet duct and distributed evenly about the circumference of the outlet duct each hook member defining a generally "U" shaped slot extending across the width of the hook member, each generally "U" shaped slot having a first surface extending generally perpendicular to the central longitudinal axis and an adjacent second surface extending generally perpendicular to the first surface;
   (b) a plurality of first nozzle flaps distributed about the circumference of the outlet duct;
   (c) a journal shaft having two adjacent perpendicular surfaces, the length of the journal shaft exceeding the width of the hook members;
   (d) attachment means to attach a journal shaft to each hook member such that the perpendicular surfaces on the shaft contact the first and second surfaces of the hook member slot;
   (e) cylindrical bearing means on each end of the journal shaft;
   (f) a plurality of control lever members operatively connected to selected nozzle flaps and pivotally attached to the cylindrical bearing means such that each control lever member pivots about an axis extending generally perpendicular to the central longitudinal axis;
   (g) ball joint means interconnecting adjacent control lever members so as to synchronize the movement of the control lever members and to permit variation in the distance between adjacent control lever members as they pivot about their axes; and,
   (h) a plurality of control cylinder means each having a stationary portion attached to the outlet duct and a movable portion attached to a control lever member such that the angle of the nozzle flaps with respect to the central longitudinal axis may be adjusted.

2. The improved exhaust nozzle assembly of claim 1 wherein each journal shaft defines a transverse threaded opening and the attachment means comprises:
   (a) a threaded bolt member extending through the hook member and threadingly engaging the threaded opening of the journal shaft; and,
   (b) a tubular element interposed between the hook member and a head of the bolt member.

3. The improved exhaust nozzle assembly of claim 1 wherein the angle between the pivoting axes of adjacent control lever members taken in a plane transverse to the central longitudinal axis is approximately 360/N degrees, wherein N=total number of control lever members.

4. The improved nozzle assembly of claim 1 wherein the ball joint means comprises:
   (a) a female ball joint member attached to an end of a first control lever member;
   (b) a male ball joint member attached to an end of a second, adjacent control lever member, the male and female ball joint members connected together so as to pivot about a pivot center located in a plane defined by the central longitudinal axis and a point of intersection of the pivot axes of the first and second control lever members.

5. The improved exhaust nozzle assembly of claim 4 wherein the female ball joint member comprises:
   (a) a female ball joint element;
   (b) twin latches attached to the female ball joint element; and,
   (c) means to pivotally attach the latches to an end of a control lever member.

6. The improved exhaust nozzle assembly of claim 5 wherein the male ball joint member comprises:
   (a) a mounting arm extending from an end of a control lever member; and,
   (b) a male ball joint element attached to a distal end of the mounting arm.

7. The improved exhaust nozzle assembly of claim 4 wherein:

(a) a plurality of first control lever members, each defining a generally radially extending groove at each end thereof, and wherein the female ball joint members are located within the grooves; and (b) a plurality of second control lever members having a male ball joint member attached to each end thereof so as to engage the female ball joint members of the first control lever members disposed on either side of the second control lever members.

8. The improved exhaust nozzle assembly of claim 7 wherein each first control lever member comprises:

(a) a transverse portion extending generally transversely of the central longitudinal axis, the ends of the transverse portion defining the radially extending grooves; and (b) a pair of legs extending from a radially inward side of the transverse portion generally perpendicular thereto, the distal ends of the legs bearing against a corresponding first nozzle flap.

9. The improved exhaust nozzle assembly of claim 8 wherein each second control lever member comprises:

(a) a transverse portion extending generally transversely of the central longitudinal axis; and, (b) a pair of legs extending from a radially inward side of the transverse portion generally perpendicular thereto, the distal ends of the legs bearing against a corresponding first nozzle flap.

10. The improved exhaust nozzle assembly of claim 9 wherein each first and second control lever member further comprises a longitudinal arm extending from each leg, the distal end of each longitudinal arm bearing against a corresponding nozzle flap.

11. The improved exhaust nozzle assembly of claim 10 further comprising means to attach the distal end of each longitudinal arm to a corresponding nozzle flap.

12. The improved exhaust nozzle assembly of claim 10 wherein the movable portions of the control cylinder means are attached to the first control lever members.

13. The improved exhaust nozzle assembly of claim 10 wherein the movable portions of the control cylinder means are attached to the second control lever members.

14. The improved exhaust nozzle assembly of claim 4 wherein each control lever member defines a generally radially extending groove at a first end in which is mounted the female ball joint member and has means to attach the male ball joint member to a second, opposite end.

15. The improved exhaust nozzle assembly of claim 14 wherein the female ball joint member comprises:

(a) a female ball joint element;

(b) twin latches attached to the female ball joint element; and, (c) means to pivotally attach the latches to the control lever member.

16. The improved exhaust nozzle assembly of claim 15 wherein the male ball joint member comprises:

(a) a mounting arm extending from the opposite end of the control lever member; and, (b) a male ball joint element attached to a distal end of the mounting arm.

17. The improved exhaust nozzle assembly of claim 16 wherein each control lever member comprises:

(a) a transverse portion extending generally transversely on the central longitudinal axis, the female ball joint member being mounted to one end of the transverse portion and the male ball joint member being mounted at an opposite end; and, (b) a pair of legs extending from a radially inward side of the transverse portion generally perpendicular thereto, the distal ends of the legs bearing against a corresponding first nozzle flap.

18. The improved exhaust nozzle assembly of claim 17 wherein each control lever member further comprises a longitudinal arm extending from each leg, the distal end of each arm bearing against a corresponding nozzle flap.

19. The improved exhaust nozzle assembly of claim 18 further comprising means to attach the distal end of each longitudinal arm to a corresponding nozzle flap.

* * * * *

UNITED STATES PATENT AND TRADEMARK OFFICE
CERTIFICATE OF CORRECTION

PATENT NO. : 4,641,783

DATED : February 10, 1987

INVENTOR(S) : Andre A. M. L. CAMBOULIVES

It is certified that error appears in the above-identified patent and that said Letters Patent is hereby corrected as shown below:

First page, under "Abstract", line 3 after "control", "levels" should be --levers--.

Column 6, line 29, "it" should be --its--.

Column 7, line 53, "contrued" should be --construed--.

Signed and Sealed this

Eighth Day of September, 1987

Attest:

DONALD J. QUIGG

*Attesting Officer*  *Commissioner of Patents and Trademarks*